United States Patent
Bogdahn

(10) Patent No.: US 8,528,850 B2
(45) Date of Patent: Sep. 10, 2013

(54) BRAKING DEVICE FOR A ROPE PULLEY OF A MECHANICALLY RETRACTABLE AND EXTENDABLE LEASH FOR WALKING ANIMALS

(75) Inventor: Manfred Bogdahn, Hamburg (DE)

(73) Assignee: Flexi-Bogdahn Technik GmbH & Co. KG, Bargteheide (DE)

( * ) Notice: Subject to any disclaimer, the term of this patent is extended or adjusted under 35 U.S.C. 154(b) by 245 days.

(21) Appl. No.: 13/075,333

(22) Filed: Mar. 30, 2011

(65) Prior Publication Data

US 2011/0239956 A1    Oct. 6, 2011

(30) Foreign Application Priority Data

Apr. 3, 2010  (DE) .................... 20 2010 004 484 U

(51) Int. Cl.
*B65H 59/00* (2006.01)
(52) U.S. Cl.
USPC .............. 242/396.1; 242/396.4; 242/422.2; 119/796
(58) Field of Classification Search
USPC .......... 242/396, 396.1–396.2, 396.4, 422.2, 242/394; 119/794, 796
See application file for complete search history.

(56) References Cited

U.S. PATENT DOCUMENTS

| | | | | |
|---|---|---|---|---|
| 3,847,377 A * | 11/1974 | Byrd | ............... | 242/396 |
| D235,026 S | 4/1975 | Bogdahn | | |
| 5,377,626 A * | 1/1995 | Kilsby et al. | ............ | 119/796 |
| 5,483,926 A | 1/1996 | Bogdahn | | |
| D392,429 S | 3/1998 | Plewa et al. | | |
| 6,148,773 A | 11/2000 | Bogdahn | | |
| 6,158,684 A * | 12/2000 | Hedlund | ............ | 242/381 |
| D439,302 S | 3/2001 | Plewa | | |
| 6,648,261 B2 * | 11/2003 | Irving | ............ | 242/384.7 |
| 6,904,872 B2 * | 6/2005 | Muller | ............ | 119/796 |
| D519,246 S | 4/2006 | Plewa | | |
| 7,168,393 B2 | 1/2007 | Bogdahn et al. | | |
| D573,314 S | 7/2008 | Plewa | | |
| D610,752 S | 2/2010 | Roediger | | |
| 2008/0011895 A1 | 1/2008 | Bleshoy | | |
| 2008/0230015 A1 * | 9/2008 | Bleshoy | ............ | 119/796 |
| 2008/0276882 A1 | 11/2008 | Bogdahn | | |
| 2009/0114759 A1 | 5/2009 | Bogdahn | | |

\* cited by examiner

*Primary Examiner* — Sang Kim
(74) *Attorney, Agent, or Firm* — Howson & Howson LLP

(57) ABSTRACT

A braking device for a rope pulley of a mechanically retractable and extendable leash for walking animals is provided. The rope pulley is supported in a housing such that it is rotatable in an unwinding direction against the force of a spring and in a wind-up direction under the influence of the spring force and cooperates with a brake button of the braking device in order to stop rotation of the rope pulley. The rope pulley is connected to a brake disk that is rotatable relative to the rope pulley against a damping force and that can be locked to the housing.

14 Claims, 2 Drawing Sheets

BRAKING DEVICE FOR A ROPE PULLEY OF A MECHANICALLY RETRACTABLE AND EXTENDABLE LEASH FOR WALKING ANIMALS

BACKGROUND

The invention pertains to a braking device for a rope pulley of a mechanically retractable and extendable leash for walking animals. The rope pulley is supported in a housing such that it is rotatable in an unwinding direction against the force of a spring, and in a wind-up direction under the influence of the spring force, and cooperates with a brake button of the braking device in order to stop the rope pulley. The invention specifically pertains to a dog leash and although the following description primarily refers to a dog leash, this should not be interpreted in a restrictive sense.

A dog leash of this type with a braking device is known from EP 0 941 657 B1 (which corresponds to U.S. Pat. No. 6,148,773 issued to Bogdahn). In this case, the brake button of the braking device cooperates with locking projections on the rope pulley in order to lock the rope pulley on the housing. This braking device enables the user to choose between the disengaged position of the brake button and the functional position of the brake button. In the disengaged position, the rope pulley is freely rotatable relative to the housing. Consequently, the dog attached to the leash is able to move freely in accordance with the maximum length of the leash. When the dog approaches the user, the excess leash is automatically wound up on the rope pulley due to the spring force. In the functional position, at least the additional unwinding of the leash from the rope pulley is prevented.

If the dog runs away from the user at a relatively fast pace, a relatively sudden and abrupt stop of the rotational movement of the rope pulley is achieved by moving the brake button from the disengaged position into the functional position. This subjects the user to a jerking movement that can be perceived as unpleasant.

SUMMARY OF THE INVENTION

The invention is based on the objective of designing a braking device of the initially described type in such a way that the rotational movement relative to the housing can be dampened.

According to the invention, this objective is attained in that the rope pulley is connected to a brake disk that is rotatable relative to the rope pulley against a damping force and can be locked on the housing. Due to this arrangement, the brake disk is locked on the housing in order to dampen the rotational movement. In this case, the rope pulley can only move relative to the housing against the damping force. However, this damping force does not act upon the user directly or jerkily, but rather results in a gentle deceleration of the rope pulley. The brake button can be subsequently actuated in order to lock the rope pulley on the housing. Only this actuation prevents the leash from being additionally unwound from the rope pulley.

It would be possible that the brake disks frictionally cooperate with the rope pulley. This embodiment can be realized with relatively simple means. The problem in this case can be seen in that the friction surfaces wear down when the leash is used such that the damping effect diminishes in the course of time.

According to one preferred embodiment of the invention, it is proposed that the brake disk cooperates with the rope pulley by means of a fluid. In this case, a fluid situated between the rope pulley and the brake disk generates a braking moment during a rotation of the brake disk relative to the rope pulley. Such a fluid brake is not subjected to wear and also maintains it's damping properties after an extended period of use.

Another advantage can be seen in that the damping force increases as the relative speed between the brake disk and the rope pulley increases. Due to this measure, a relatively high braking moment is generated with simple means when the brake disk is locked during a fast rotational movement of the rope pulley. A dog running away from the user therefore can be effectively stopped. Another advantage is attained, in particular, in that the leash is not ripped out of the user's hand during the braking process.

It would be possible that the rope pulley is connected in a rotationally rigid fashion to a clutch disk that rotates in a circumferential gap of the brake disk, and that the fluid is situated in the gap. Such an arrangement can be easily manufactured. In addition, the desired damping force can be achieved when the brake disk is locked by designing and dimensioning the gap between the clutch disk and the brake disk accordingly. In this case, it would be possible that at least one of the facing surfaces of the brake disk and the clutch disk is profiled. This makes it possible to additionally increase the braking moment being generated.

It would be possible that the brake disk can be locked on the housing by means of an actuating element. This actuating element can be operated from outside by the user such that the dampened rotational movement of the rope pulley can be adjusted at all times.

According to one preferred embodiment of the invention, it is proposed that the brake button locks the brake disk on the housing in a first functional position and locks the rope pulley on the housing in a second functional position. In this case, it would be possible that the brake button carries out a linear movement that essentially extends radially referred to the rope pulley. During the course of this movement, the brake disk can be initially locked on the housing. In this position, the rotational movement of the rope pulley is decelerated, but not yet blocked.

During the course of the further movement of the brake button, it reaches its functional position, in which the brake button engages with locking tabs on the rope pulley in order to lock the rope pulley on the housing. The additional unwinding of the leash from the rope pulley is only prevented once this second functional position is reached. The first and the second functional position consequently lie in succession referred to the actuating direction such that a user-friendly operation is achieved.

In the disengaged position of the brake button, the rope pulley and the brake disk are freely rotatable relative to the housing. It would furthermore be possible that the brake button is held in the first functional position by a stop that needs to be overcome by the user. This significantly improves the ease of use of the leash. The user senses a noticeable stop, at which he needs to hold the brake button in order to realize the dampened unwinding movement or wind-up movement of the rope pulley relative to the housing. This stop is overcome by increasing the pressure exerted upon the brake button such that the rope pulley is completely locked on the housing.

The brake disk may be realized in the form of a disk that is narrow in the axial direction and arranged axially adjacent to the rope pulley. Due to this measure, the housing is only insignificantly wider than that of a conventional leash without this damping option. The brake disk is realized thin relative to the axial dimension of the rope pulley. It would furthermore be possible that the brake disk features a thickened hub, in which the gap for accommodating the clutch disk is arranged. This hub may be partially arranged in the hub of the rope pulley. This measure also does not significantly widen the housing such that an appealing exterior of the leash can be achieved.

According to an enhanced embodiment of the invention, it is proposed that the brake disk and the clutch disk form a preassembled unit that can be connected to the rope pulley. For this purpose, the clutch disk is connected in a rotationally rigid fashion to the rope pulley. This simplifies the manufacture of a leash with such a braking device.

BRIEF DESCRIPTION OF THE DRAWINGS

The invention is described in greater detail below with reference to the schematic drawings. In these drawings.

DETAILED DESCRIPTION

Figure 3:
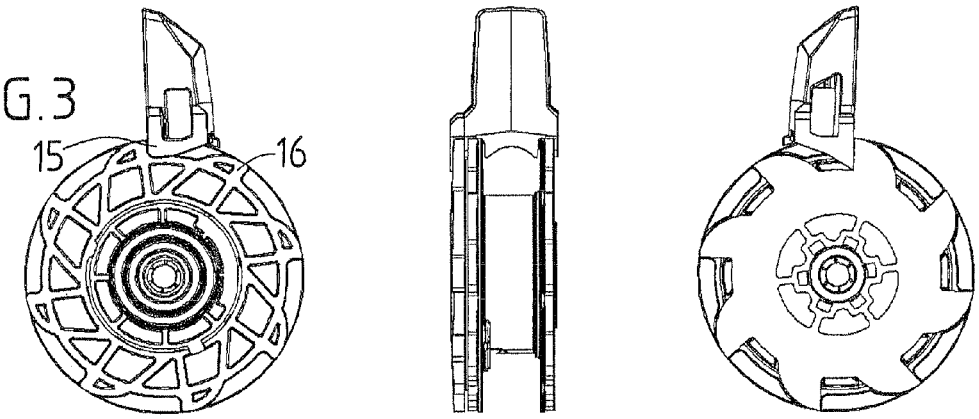
FIG. 3 shows different views of the rope pulley with the brake button in its second functional position.

The rope pulley 11 illustrated in the drawings is supported in a housing (not shown) such that it is rotatable about an axis 12. The rope pulley 11 features two flanks 13 that are spaced apart from one another and between which the leash can be wound up. The leash extends out of the housing through an opening. A brake button 14 is arranged on the housing such that it can be moved back and forward approximately in the direction of the rotational axis against the force of a pressure spring (not shown). The brake button features locking tabs 15 that cooperate with the projections 16 on the flanks 13 of the rope pulley 11 in the second functional position of the brake button illustrated in FIG. 3. In this position, the rope pulley can no longer turn relative to the housing. The design of such a dog leash is generally known and therefore requires no further explanation.

A brake disk 17 is provided axially adjacent to the rope pulley and able to turn relative to the rope pulley 11 against a damping force. The brake disk 17 rotates about the same rotational axis 12 as the rope pulley 11 in this case. Projections 18 provided on the circumferential surface of the brake disk 17 cooperate with an additional projection 19 of the brake button.

Figure 1:
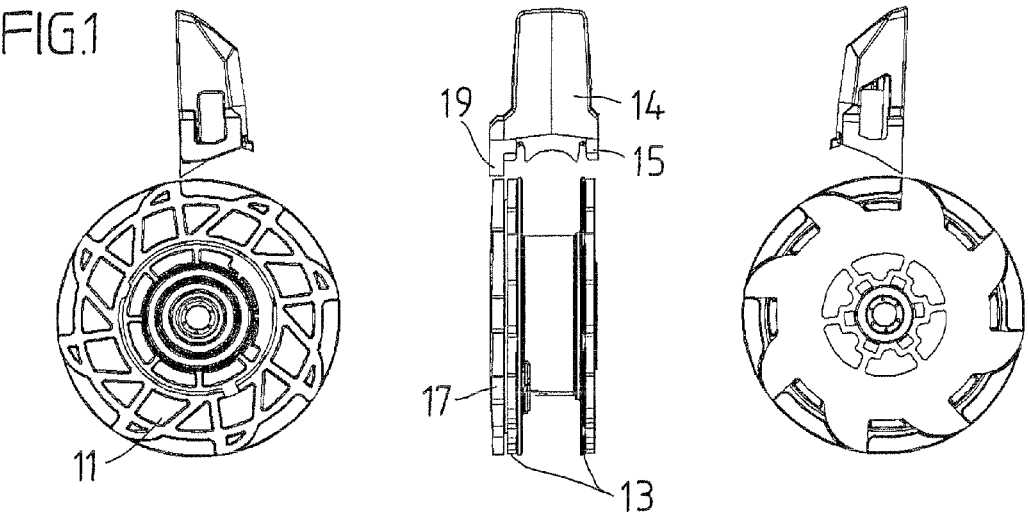
FIG. 1 shows different views of the rope pulley with the brake button in its disengaged position.

The arrangement is specifically realized such that the additional projection 19 is not engaged with the locking tabs 18 of the brake disk 17 in the disengaged position illustrated in FIG. 1. In this disengaged position, the locking tabs 15 are also disengaged from the projections 16 of the rope pulley 11. The rope pulley therefore is supported in the housing in a freely rotatable fashion together with the brake disk 17.

Figure 2:
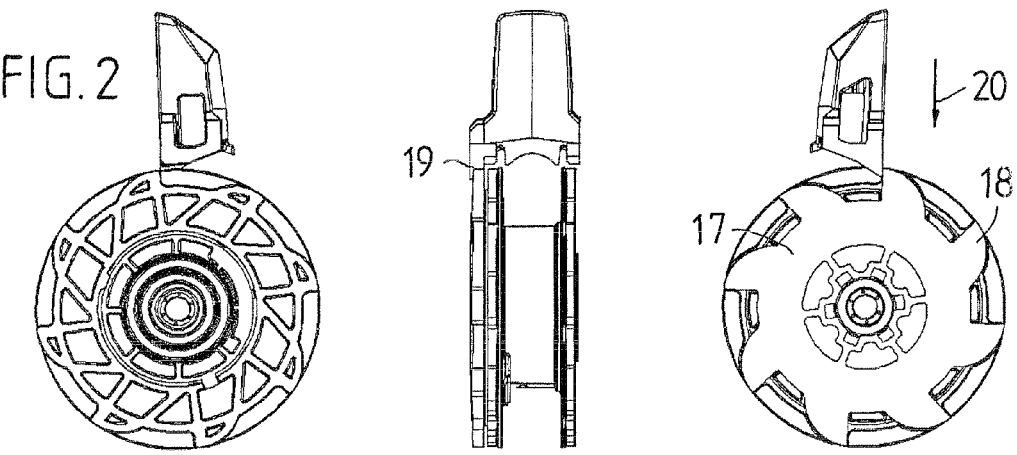
FIG. 2 shows different views of the rope pulley with the brake button in its first functional position.

If the brake button 14 is now pressed toward the rope pulley in the direction of the arrow 20, the additional projection 19 initially engages with a projection 18 of the brake disk 17 assigned thereto. This means that a first functional position is reached, in which the additional projection 19 is engaged with the projection 18 of the brake disk 17. However, the locking tabs 15 are not yet engaged with one of the projections 16 of the rope pulley in this position of the brake button. This position of the brake button 14 is illustrated in FIG. 2.

In this first functional position of the brake button, the brake disk consequently is locked relative to the housing. This means that the rope pulley 11 can only turn if it overcomes the frictional force between the brake disk 17 and the rope pulley 11. In this first functional position, the dog leash can only be retracted or extended with a more significant expenditure of force. It would be possible to hold the brake button 14 in this first functional position by means of a stop. This stop clearly defines a position of the brake button relative to the housing, in which the additional projection 19 is engaged with the brake disk 17, but the locking tabs 15 are not yet engaged with the projections 16 of the rope pulley. The brake button reaches its second functional position illustrated in FIG. 3 by exerting additional pressure upon the brake button 14 in the direction of the arrow 20. In this position, the locking tab 15 engages with one of the projections 16 of the rope pulley such that the rope pulley is prevented from additionally turning relative to the housing. The further extension of the dog leash therefore is stopped.

Figure 4:
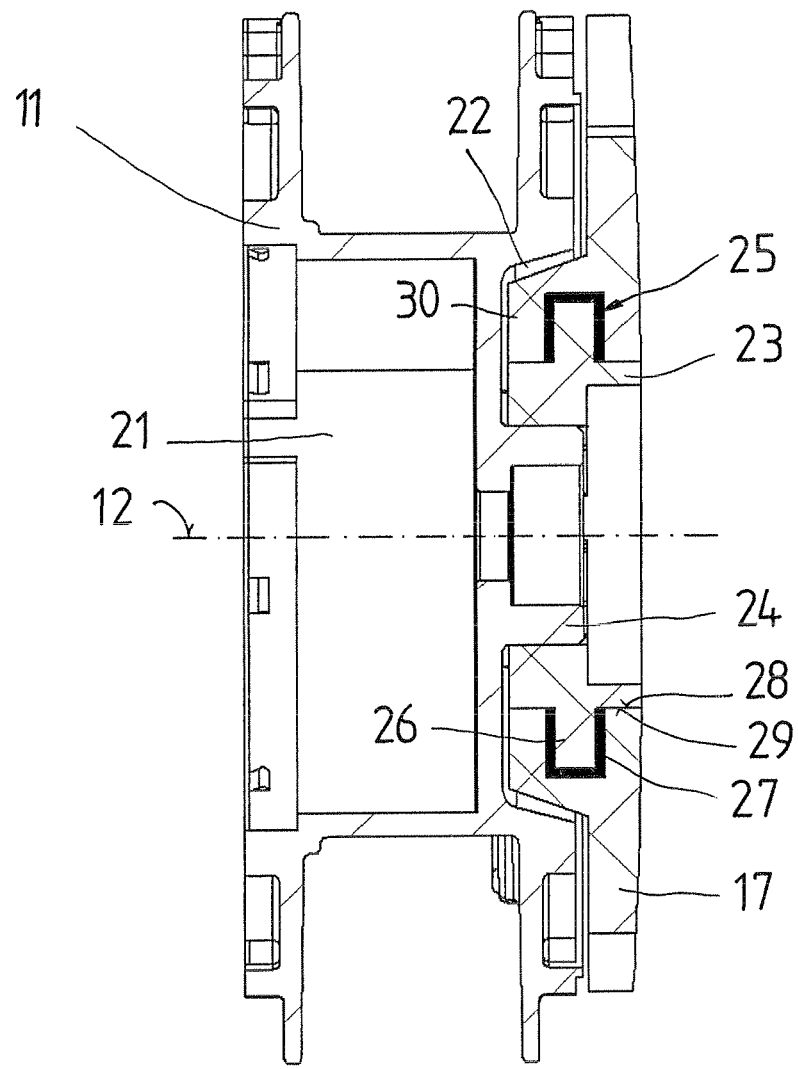
FIG. 4 shows a section through the rope pulley with a braking device according to the invention.

FIG. 4 shows one possible embodiment of the invention between the brake disk 17 and the rope pulley 11. The rope pulley 11 features a hub 21, in which the spring for realizing the wind-up movement is arranged. One side of the hub furthermore features a depression 22, in which a clutch disk 23 is connected in a rotationally rigid fashion to the rope pulley 11 by means of a pin 24.

The clutch disk 23 is connected to the brake disk 17 by means of a fluid 25. The arrangement is specifically realized such that the clutch disk 23 moves in a circumferential groove 27 of the brake disk 17 with a revolving radial projection 26. For this purpose, the brake disk 17 features a hub 30 that is widened in comparison with the thickness of the brake disk and in which the circumferential groove is arranged.

A gap, in which the fluid is situated, is formed between the radial projection 26 and the circumferential groove 27. The clutch disk 23 and the brake disk 17 therefore can be turned relative to one another. However, the relative rotational movement between the brake disk 17 and the clutch disk 23 and therefore the rope pulley 11 is dampened by the fluid 25 situated in the gap.

Due to this arrangement, the rope pulley only can additionally turn after the brake disk 17 is locked on the housing if it overcomes the damping force or frictional force. The rope pulley is only completely locked on the housing once the brake button is completely depressed in the direction of the arrow 20.

The brake disk 17 may, for example, be realized in two parts in the axial direction in order to accommodate the revolving projection 26 of the clutch disk. The facing circumferential surfaces 28, 29 of the brake disk 17 and the clutch disk 23 may adjoin one another in a sealing fashion such that the fluid is prevented from escaping. However, it would also be possible to provide sealing elements in these surfaces.

A thusly designed dog leash makes it possible to decelerate the rotational movement of the rope pulley before it is completely locked on the housing. This is much more pleasant for the user. It would furthermore be possible that the damping force exerted upon the rope pulley by the brake disk is greater than the restoring force of the spring, by means of which the leash is wound up on the rope pulley. In this case, a decelerated retraction is prevented and the dog notices a distinct resistance in the unwinding direction.

I claim:

1. An assembly for a mechanically retractable and extendable leash for walking animals, comprising:
a rope pulley (11) rotatable in a leash unwinding direction and in an opposite leash wind-up direction;

a brake disk (17) connected to said rope pulley (11) such that said brake disk (17) is rotatable relative to the rope pulley (11) against a damping force in the leash unwinding direction; and a brake button (14) movable relative to said rope pulley (11) and brake disk (17) between a disengaged position, a first functional position, and a second functional position;

when said brake button (14) is in said disengaged position, said rope pulley (11) and brake disk (17) are freely rotatable relative to said brake button (14);

when said brake button (14) is in said second functional position, said brake button (14) engages said rope pulley (11) and brake disk (17) such that said rope pulley (11) and brake disk (17) are prevented from rotation in the leash unwinding direction relative to said brake button (14); and when said brake button (14) is in said first functional position, said brake button (14) engages said brake disk (17) such that said brake disk (17) is prevented from rotation in the leash unwinding direction relative to said brake button (14), and said brake button (14) permits rotation of said rope pulley (11) relative to said brake button (14) such that rotation of said rope pulley (11) in the leash unwinding direction is permitted only when said damping force between relative rotation of said rope pulley (11) and said brake disk (17) is overcome;

whereby rotation of the rope pulley (11) in the leash unwinding direction is damped when the brake button is in said first functional position thereby preventing injury to a leashed animal due to avoidance of an otherwise sudden or abrupt stoppage of rotation of said rope pulley (11).

2. The assembly according to claim 1, wherein the brake disk (17) frictionally cooperates with the rope pulley (11) to produce said damping force.

3. The assembly according to claim 1, wherein the brake disk (17) cooperates with the rope pulley (11) by means of a fluid (25) to produce said damping force.

4. The assembly according to claim 3, wherein the rope pulley (11) is connected in a rotationally rigid fashion to a clutch disk (23) that rotates in a circumferential groove (27) of the brake disk (17), and wherein the fluid (25) is situated in the groove (27).

5. The assembly according to claim 4, wherein at least one of the facing surfaces of the brake disk (17) and the clutch disk (23) is profiled.

6. The assembly according to claim 4, wherein the brake disk (17) has a thickened hub (30), in which the groove (27) accommodating the clutch disk (23) is arranged.

7. The assembly according to claim 4, wherein the brake disk (17) and the clutch disk (23) form a preassembled unit that can be connected to the rope pulley (11).

8. The assembly according to claim 1, wherein the brake disk (17) is realized in the form of a disk that is narrow in an axial direction and arranged axially adjacent to the rope pulley (11).

9. A device having a mechanically retractable and extendable leash for walking animals, comprising:

a rope pulley rotatable about an axis in a leash unwinding direction and in an opposite leash wind-up direction;

a brake disk connected to said rope pulley and rotatable relative to said rope pulley about said axis against a damping force which damps rotation of said rope pulley relative to said brake disk;

a brake button movable relative to said rope pulley and brake disk between a disengaged position, a first functional position, and a second functional position;

when said brake button is in said disengaged position, said rope pulley and brake disk are freely rotatable relative to said brake button;

when said brake button is in said second functional position, said brake button engages said rope pulley and said brake button such that said rope pulley and brake disk are prevented from rotation in the leash unwinding direction relative to said brake button; and when said brake button is in said first functional position, said brake button engages said brake disk and prevents said brake disk from rotation in the leash unwinding direction relative to said brake button, and said brake button permits rotation in the leash unwinding direction of said rope pulley relative to said brake button and brake disk subject to said damping force.

10. The device according to claim 9 wherein said brake disk is in frictional engagement with said rope pulley via means of a fluid which produces said damping force.

11. The device according to claim 10, wherein said rope pulley is connected in a rotationally rigid fashion to a clutch disk that rotates in a circumferential groove of said brake disk, and wherein said fluid is situated in said circumferential groove.

12. The device according to claim 11, wherein at least one facing surface of said brake disk and said clutch disk is profiled, and wherein said brake disk has a hub in which said circumferential groove accommodating said clutch disk is arranged.

13. The device according to claim 11, wherein said brake disk and said clutch disk form a preassembled unit that is connected to said rope pulley.

14. The device according to claim 11, wherein said brake disk is a disk that is narrow in an axial direction and arranged axially adjacent to said rope pulley.

* * * * *